Dec. 11, 1962 C. S. GALTZ 3,068,371
SUBMERSIBLE MOTOR WITH A SEALED ROTOR CHAMBER
Filed Dec. 6, 1957 3 Sheets-Sheet 1

Dec. 11, 1962  C. S. GALTZ  3,068,371
SUBMERSIBLE MOTOR WITH A SEALED ROTOR CHAMBER
Filed Dec. 6, 1957  3 Sheets-Sheet 2

Dec. 11, 1962 C. S. GALTZ 3,068,371
SUBMERSIBLE MOTOR WITH A SEALED ROTOR CHAMBER
Filed Dec. 6, 1957 3 Sheets-Sheet 3

United States Patent Office 3,068,371
Patented Dec. 11, 1962

3,068,371
SUBMERSIBLE MOTOR WITH A SEALED
ROTOR CHAMBER
Charles S. Galtz, Pittsburgh, Pa., assignor to Westinghouse
Electric Corporation, East Pittsburgh, Pa., a corporation of Pennsylvania
Filed Dec. 6, 1957, Ser. No. 701,202
13 Claims. (Cl. 310—87)

The present invention relates to electric motors wherein one or more of the stator and rotor thereof are hermetically sealed or "canned," and more particularly to an electric motor wherein the "can" or sealed enclosure serves as a pressure vessel for separating the rotor chamber from the stator chamber, when relatively great differentials in pressure are maintained between these chambers.

There are many applications wherein the rotor or stator of an electric motor must be hermetically sealed for immersion within a fluid system. Examples of such applications comprise various types of submersible motor-pump units in which the rotor and impeller thereof are usually immersed in the fluid being pumped. In other cases the sealed rotor is arranged for driving a lead screw, or the like, which in turn is coupled to valve actuating mechanism likewise sealed within the system, or to other suitable element or control means adapted for use within the sealed system. The stator of the motor unit usually is separated from the fluid system by means of one or more cans or sealed sleeves enclosing the rotor and stator. Generally it has been the practice to fabricate the aforesaid cans from a very thin magnetic material in order to avoid distorting or short-circuiting the magnetic fluxile paths between the stator and rotor poles. In these structures, the stator enclosure, when the motor is employed with a highly pressurized sealed system, is supported by the stator structure and by suitable backing-up sleeves secured to either end of the stator structure in a known manner. However, in order to prevent the stator can from being forced into the stator winding slots which usually open into the bore thereof, these slots have to be closed in some manner or non-magnetic inserts must be inserted therein so as to overlie the stator windings. These expedients, however, either complicate the stator structure or increase the expenditure of time in fabricating the same or both.

As an altenative, the stator enclosure can be provided with sufficient thickness to withstand the pressures developed within the fluid system. However, if the stator enclosure is formed from non-magnetic material, the resulting gap between the stator and rotor poles is too great to permit the motor to develop sufficient driving torque. On the other hand, if the thickened stator enclosure is formed from a magnetic material, a major part of the stator flux is thereby short-circuited and the motor again does not develope sufficient torque.

In view of the foregoing discussion, it is an object of the invention to provide a novel and efficient submersible electric motor.

Another object of the invention is to provide an electric motor of the character described and adapted for use within highly pressurized or hermetically sealed systems.

A further object of the invention is to provide a canned electric motor having novel means associated therewith for decreasing the gap in the magnetic circuit between the stator and rotor poles.

Still another object of the invention is to provide an electric motor having a novel arrangement of stator poles.

A still further object of the invention is the provision of an electric motor having a novel and efficient stator can or enclosure.

These and other objects, features, and advantages of the invention will be elaborated upon during the forthcoming description of illustrative embodiments of the invention, with the description being taken in conjunction with the accompanying drawings, wherein.

According to the invention, a sealed electric motor is provided wherein, in one arrangement, the stator enclosure or can is fabricated in the form of a pressure vessel which isolates the stator assembly of the motor from the rotor thereof which is immersed within the fluid of the system. The pressurized stator enclosure is provided with novel means for largely preventing short-circuiting of the stator flux between adjacent stator poles and in addition for preventing smearing of the stator flux among two or more of the rotor poles. The aforesaid means thus enables a relatively thick stator enclosure to be employed within the submersible motor so that the motor can be employed in conjunction with highly pressurized fluid systems without the provision of auxiliary supporting means for the enclosure.

Figure 1:
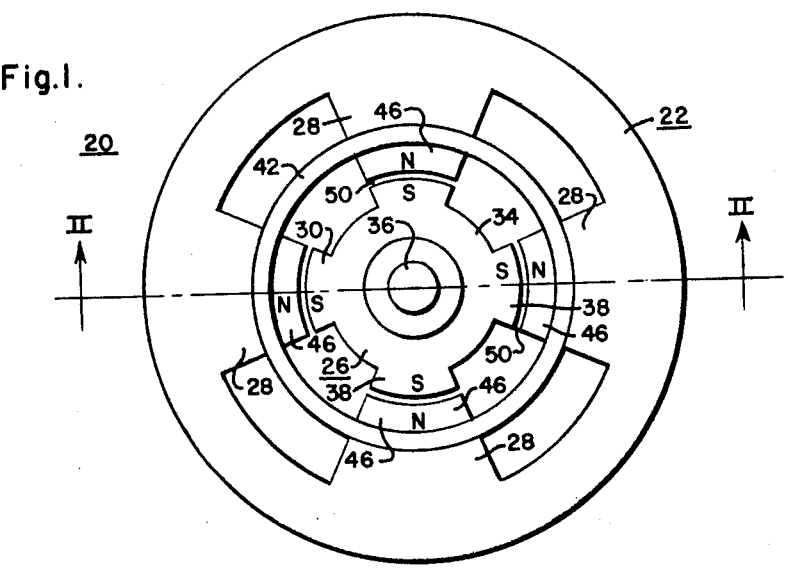
FIGURE 1 is an end elevational view of one form of sealed electric motor constructed in accordance with the principles of this invention and having parts thereof removed and other parts broken away for purposes of illustration.
Figure 2:
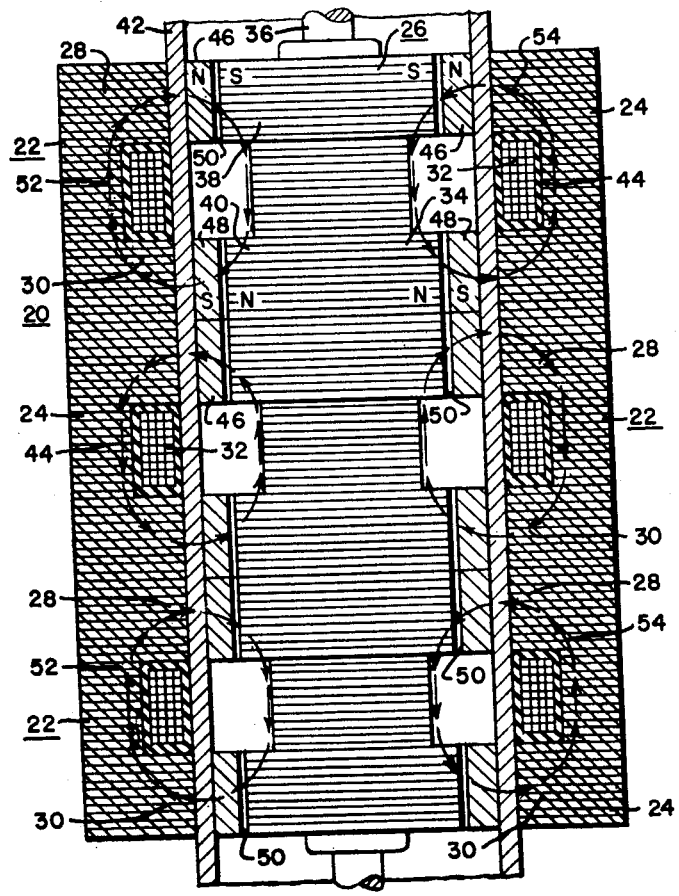
FIG. 2 is a longitudinal sectional view showing the electric motor of FIG. 1 and taken along reference line II—II thereof.

Referring now more particularly to FIGS. 1 and 2 of the drawings, the principles of the invention are embodied, in this example, in a concentric coil or stepwise motor 20. The motor 20 comprises at least three stacks or sections 22 with each of the stacks comprising a stator or field section 24 and an armature or rotor section 26. In this arrangement of the invention each motor section 22 is provided with four pairs of spaced north and south poles 28 and 30 respectively. The north poles 28 are spaced around the periphery of the stator bore and are disposed at one side of a concentric stator coil or winding 32. The south poles are disposed at correspondingly opposite sides of the stator windings 32. The rotor 34 which is provided with a number of armature sections 26 corresponding to that of the stator sections 24 is mounted for rotation upon a shaft 36. The shaft 36 desirably is supported in suitable well-known antifriction means (not shown).

Each rotor section 26 is provided with salient south and north poles 38 and 40 which are arranged in positions corresponding respectively to those occupied by the north and south poles 28 and 30 of each stator section. However, the poles of each stator section 24 or of each rotor section 26 are displaced one-third of a pole pitch relative to an adjacent stator or rotor section, in the event that three stacks 22 are utilized. Stepwise movement of the rotor is then effected by energizing each stator section 24 intermittently and successively in order that the armature will move through approximately one-third pole pitch during each such energization. Suitable well known circuit means (not shown) are provided for sequentially energizing the concentric stator windings 32. Such circuit means conveniently can be arranged in the form of a rotatable multi-contact switch, or the like. The fundamental principles upon which the operation of these stepwise motors is based are well known and accordingly a more detailed description will be omitted. Suffice it to say, however, that the torque developed by the rotor 34 results from a slight displacement between the poles of the energized stator section 24 and the corresponding poles of the adjacent rotor section 26 as caused by a load applied to the rotor shaft 36.

In this example of the invention, the stator sections 22 are mounted in tandem upon a pressurized rotor enclosure or "can" 42. The can 42 is fabricated with sufficient thickness in order to withstand the pressures developed therewithin and to serve as a means for supporting the aforesaid stator sections when assembled thereon. More particularly, the rotor enclosure 42 is formed with a thickness sufficient to prevent deformation thereof into slots 44 into which the concentric windings 32 are inserted, when the motor 20 is employed in conjunction with a highly pressurized system, and the can 42 is coupled in communication with this system. The windingless rotor 34 thus is enclosed within the system and the driving shaft 36 is coupled to a desired operating mechanism also sealed within the aforesaid system, which mechanism includes for an example the aforesaid lead screw, pumping impeller or suitable stirrer.

In order to minimize the effects of magnetic flux short-circuiting or smearing which would otherwise be caused by the enclosure 42, when the latter is fabricated from a magnetic material, the stator poles 28 and 30 are effectively extended through the enclosure 42. With this arrangement a relatively small "air gap" can be formed between the salient poles 38 and 40 of the rotor 34 and the aforesaid extensional means.

One form of means for so extending the stator poles includes a plurality of pole pieces 46 and 48 which correspond in number to that of the stator poles 28 and 30, respectively. The pole pieces 46 and 38 are formed integrally with the rotor enclosure 42 or otherwise secured thereto at positions correspondingly adjacent the stator poles 28 and 30. Inasmuch as the enclosure 42 desirably is formed from a magnetic material in order to minimize the air gap of the motor, and since the aforesaid pole pieces 46 and 48 are disposed in contact with the enclosure 42 which in turn is placed against the stator poles 28 and 30, the pole pieces 46 and 48 will assume the same polarity as that of the stator poles 28 and 30, respectively.

Accordingly the stator pole extensions or pieces 46 and 48 are so arranged that as small an air gap 50 as practical is formed between the rotor poles 38 and 40 and the stator pole extensions 46 and 48, respectively. Therefore, as better shown in FIG. 2 of the drawings, the individual magnetic fluxile paths of the motor will extend, in a known manner, through each stator section 24 and the associated rotor section 26 as indicated by the series of arrows 52 and 54. Due to the closeness of the stator pole extensions 46 and 48 and the adjacent salient poles 38 and 40 of the associated rotor section 26, when these poles are in substantial alignment, only a relatively minor amount of stator flux will be diverted through the rotor enclosure 42. As a result, little or no impairment in operating torque of the motor will result from the provision of the relatively thick pressurized enclosure 42 between the stator sections 22 and the rotor sections 26.

As indicated previously, the stator pole extensions 46 and 48 in one form of the invention are fabricated from separate pieces of magnetic material which are then secured to the inner periphery of the rotor enclosure 42. It is contemplated, in certain arrangements of the latter-mentioned form of the invention, that the aforesaid pole extensions 46 and 48 and the rotor enclosure 42 be made from magnetic materials having differing levels of permeability. For example, the pole pieces can be formed from a carbon steel of high permeability in order to reduce the ampere-turn losses in the pole pieces themselves.

On the other hand, the enclosure 42 is fabricated from a material having low or intermediate magnetic permeability, such as one of certain types of stainless steels or other alloy steels. In those applications wherein the motor is employed in a highly corrosive environment and subjected at the same time to extremely high pressures the enclosure 42, for example, is formed from a hardened stainless steel of relatively lower magnetic permeability. On the contrary, the stator pole extensions 46 and 48 are fabricated from an annealed stainless steel of relatively higher permeability. With this arrangement the enclosure 42 provides an adequate path for magnetic flux across the so-called air gap of the motor, that is to say in the transverse or radial direction through the enclosure, but because of the greater distances involved offers a path of much higher reluctance in the longitudinal direction or between adjacent north and south poles 28 and 30 of the stator sections 22 (FIG. 2). Accordingly, short-circuiting and smearing of flux are reduced still further.

Figure 3:
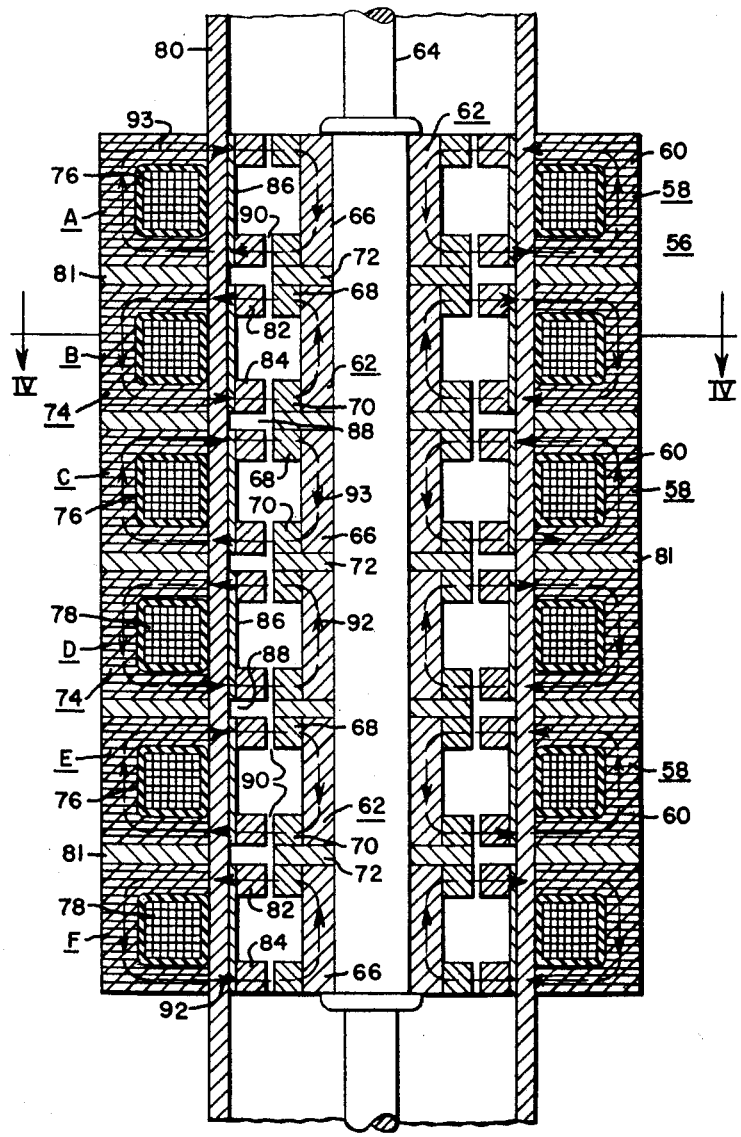
FIG. 3 is an elevational view partly in section of a sealed electric motor arranged pursuant to another modification of the invention.
Figure 4:
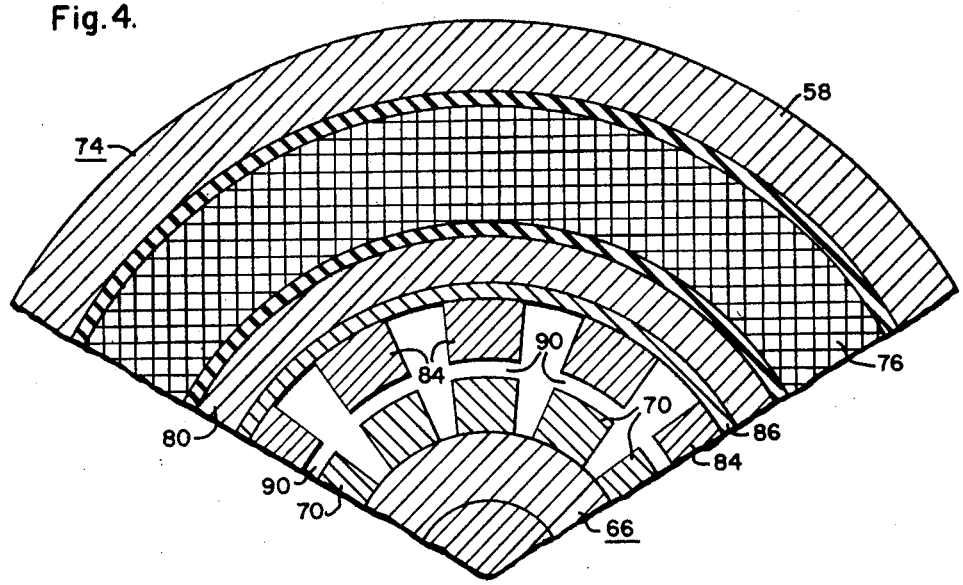
FIG. 4 is a partial cross-sectional view of the sealed electric motor of FIG. 3 taken along reference line IV—IV thereof.

Referring now to FIGS. 3 and 4 of the drawings, another form of stacked electric motor is illustrated and is arranged in accordance with the present invention. In this form of the invention, an electric motor 56 is provided with a total of six stacks 58 with each of the stacks comprising a stator assembly 60 and a rotor section denoted generally by the reference character 62. The rotor section are assembled in tandem relationship upon a driving shaft 64 which, in this example, is formed from a non-magnetic material. The rotor sections 62 each include a relatively short tubular member 66 formed from a magnetic material and secured to the driving shaft 64, for example, by means of set screws or by shrink-fitting. The tubular members 66 are each furnished with a plurality of pairs of spaced north and south pole pieces 68 and 70, respectively, which can be formed integrally with the magnetic tubular member 66, or, if desired, can be supplied separately as explained heretofore in connection with FIGS. 1 and 2. The rotor sections 62, when assembled upon the driving shaft 64 are spaced longitudinally and are insulated magnetically from one another by means of washers or spacers 72 inserted therebetween and fabricated from a non-magnetic material.

Each of the stator sections 60 which are arranged in opposition to the rotor section 62 includes a stator structure 74 likewise fabricated from a magnetic material and having a radial slot 76 opening into the bore or inner periphery thereof. Into each of the slots 76 is inserted a concentric coil winding 78. The stator structures 74 are spacedly mounted on the outer periphery of a pressurized stator enclosure 80, which is fabricated in a manner similar to that described heretofore in connection with the rotor enclosure 42 illustrated in FIGS. 1 and 2 of the drawings. The spaced relationship of the stator structure 74 is preserved by the provision of non-magnetic washers 81 inserted individually between adjacent stator structures 74 and thereby serving to insulate magnetically these structures from one another.

Each stator section 60 is provided with a plurality of pairs of south and north pole extensions 82 and 84 which are spaced about the inner periphery of each stator section in a manner such that the south poles 82 of each section, in this example, lie upwardly of the associated stator slot 76 while the north poles 84 are disposed adjacent the other side of each slot 76. In this arrangement of the invention the pole extensions 82 and 84 of each stator section 60 are mounted inwardly of the rotor enclosure 80 and are secured to or formed integrally with a relatively thin supporting cylinder 86. The supporting cylinders 86 are closely fitted within the rotor enclosure 80 and are magnetically insulated from one another by providing a gap 88 therebetween. When thus positioned the supporting cylinders 86 are secured in contact with the magnetic stator enclosure 80 in any convenient manner, for an example by shrink-fitting. The preservation of the aforesaid gaps 88 can be ensured through the use of spacing washers (not shown) similar to those washers 72 and 81 employed between the sections of the rotor and of the stator respectively. Alternatively, the supporting cylinders 86 together with the pole pieces 82 and 84 can be formed integrally with the stator enclosure 80. It will be obvious, however, that the supporting cylinders 86 can be omitted and the pole pieces 82 and 84 secured directly to or formed integrally with the stator enclosure 80.

As noted heretofore, inasmuch as the south and north poles 82 and 84 are in magnetic contact with the stator structure 74, through the stator enclosure 80 and the supporting cylinder 86, their polarities are dependent upon the direction of current flow within the concentric winding 76 in the same manner as if they were secured directly to the stator structure 74. The pole pieces 82 and 84 and the stator poles 68 and 70 are so arranged that when the adjacent rotor section 62 is aligned with its associated stator section 60, the aforesaid pole pieces and rotor poles are in substantial alignment. At the same time the poles of either each stator section or each rotor section are displaced one-sixth of a pole pitch relative to the adjacent rotor or stator section, in a motor employing six stacks, as shown in FIGS. 3 and 4. Accordingly, when the stator sections 60 are energized intermittently and successively by suitable circuit means, the driving shaft 64 is then moved approximately one-sixth of a pole pitch with each energization.

It should be noted that increased torque can be obtained from the motor illustrated in FIGS. 3 and 4 by energizing more than one stator section 60 at a given time, but yet in a sequential fashion. It has been found that the optimum driving torque is obtained when the number of stator sections 60 energized at one time is equal to one-half the total number of stacks 58—in the case of an even number of stacks—or three in the case of FIGS. 3 and 4. For a motor having an odd number of stacks the optimum condition attains when one-half less than one-half the total number of stacks are energized, which amounts to one stack of a motor having three stacks as shown in FIGS. 1 and 2.

For optimum output of driving torque, then, the stator sections 60A–60E of the motor exemplified in FIGS. 3 and 4 should be energized in accordance with the following sequence.

| Step: | Sections energized simultaneously |
|---|---|
| #1 | A, B, C |
| #2 | B, C, D |
| #3 | C, D, E |
| #4 | D, E, F |
| #5 | E, F, A |
| #6 | F, A, B |

In the case of a stacked motor (not shown) having five sections, the following sequential energization should be employed.

| Step: | Sections energized simultaneously |
|---|---|
| #1 | A, B |
| #2 | B, C |
| #3 | C, D |
| #4 | D, E |
| #5 | E, A |

As noted heretofore in connection with the air gaps 50 of FIGS. 1 and 2 of the drawings, the sealed motor 56 of FIGS. 3 and 4 is provided in a similar manner with air gaps 90 which are made as narrow as possible. In this manner the major proportion of the stator magnetic flux will flow through the stator and rotor poles as indicated by a group of arrows 92 with only a very minor portion of the flux being diverted through the stator enclosure 80 and the supporting cylinder 86. Additional reduction in magnetic interaction between the stator sections 60 is obtained by causing the magnetic flux of a given stack to be directed oppositely to that of adjacent stator sections. This can be achieved, for example, by winding all of the stator coils 78 in the same direction and by causing the current in adjacent coils to flow in opposite directions. As a result the flow of magnetic flux will be in opposite relative directions in adjacent stator structures 74, as indicated by respective groups of arrows 92 and 93 (FIG. 3). This has the effect of establishing areas of the same magnetic polarity at opposing surfaces of each adjacent pair of stator sections 60 and therefore the flow of magnetic flux therebetween is substantially eliminated. As a result the non-magnetic spacing washers 81, which are shown inserted between the stator sections, need not be employed in many applications.

Figure 5:
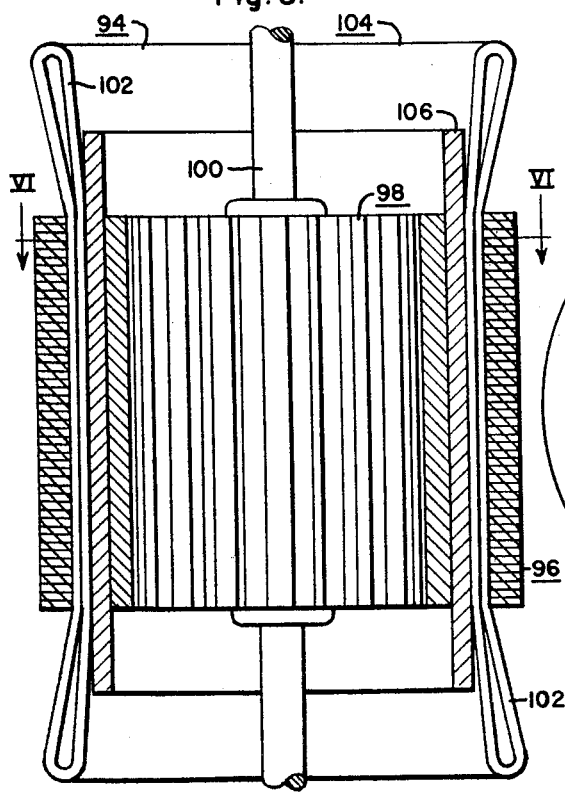
FIG. 5 is a longitudinally sectional view of still another form of sealed electric motor constructed in accordance with the invention.
Figure 6:
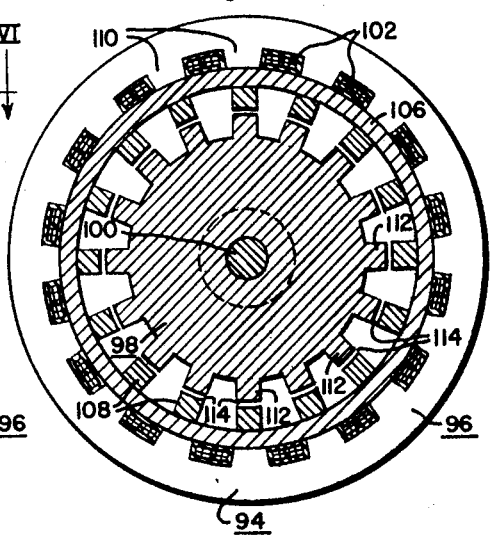
FIG. 6 is a cros-sectional view of the electric motor of FIG. 5 taken along reference line VI—VI thereof.

With reference now to FIGS. 5 and 6 of the drawings, another form of sealed electric motor arranged in accordance with the invention is illustrated herein. In this latter arrangement of the invention an electric motor 94 includes a longitudinally wound stator structure 96 and a salient pole rotor 98. The rotor 98 is mounted upon a suitable driving shaft 100 which in turn is provided with anti-frictional supporting means (not shown). About the inner periphery or bore of stator structure 96, a plurality of desirably equally spaced winding slots 102 are formed and extend in a parallel array substantially longitudinally of the stator structure 96. A conventional stator winding denoted generally by the reference character 104 is inserted into the slots 102. To permit operation of the motor 94 in conjunction with the pressurized sealed fluid system, a sealed rotor housing 106 is disposed between the stator assembly 96 and the rotor 98. The rotor 98 is thus hermetically sealed within the housing 106 upon the exterior surface of which the stator assembly 96 is mounted at a position adjacent that of the rotor 98. The driving shaft 100 of the rotor is coupled to suitable operating mechanism (not shown) likewise sealed within the aforesaid system. Accordingly, the stator 96 is isolated from the rotor 98, the operating mechanism, and other portions of the sealed system in a manner described heretofore in connection with the preceding figures.

The rotor housing 106 is fabricated with sufficient thickness to withstand the anticipated pressures to be developed in the system without being deformed into the stator slots 102. To minimize the air gap of the motor, the housing 106 is formed from a magnetic material and the stator poles are provided in the form of a plurality of longitudinally extending pole pieces 108 which are secured in spaced relation to the inner periphery of the stator can 106. The pole pieces 108 are so arranged that they lie generally at positions between those of the stator slots 102 and their polarity is determined by the direction of current flowing within the stator windings 104. Since the pole pieces 108, the rotor enclosure 106, and stator teeth 110 are in physical contact respectively, the pole pieces 108 are in effect extensions of the stator poles normally formed by one or more of the stator teeth 110. The rotor 98 likewise is furnished with a plurality of salient poles 112 extending longitudinally thereof and being equal in number to that of the stator pole pieces 108. The size of the rotor 98 and the salient poles 112 thereof are such that a relatively small air gap 114 is provided between the rotor poles 112 and the stator pole pieces 108 as is the case in conventional, unsealed motors.

The rotor 98 can be rotated continuously in the manner of a conventional motor such as by coupling the stator windings 104 for energization by a polyphasal alternating potential in order to induce a circulating motor field in the known manner. Moreover, the motor illustrated can be operated effectively from direct current or from single phase alternating current, if the rotor enclosure 106 is made relatively thin. Despite the mode of operation, however, the pole pieces 108 serve to extend the stator poles through the relatively thick rotor housing 106, and, inasmuch as the air gap 114 between the pole pieces 103 and the rotor poles 112 can be made as small as practical, only a relatively minor amount of magnetic flux is diverted through the rotor housing 106.

In view of the foregoing it will be apparent that novel and efficient forms of sealed electric motors have been illustrated and described herein. These electric motors require a minimum of component parts and are economical in design and in efficiency. The foregoing descriptive matter has been presented for purposes only of illustration and must not be interpreted as limitative in nature. It will be appreciated, then, that numerous embodiments of the invention will occur to those skilled in the art without departing from the spirit and scope of the invention.

Accordingly what is claimed as new is:

1. Electrodynamic means comprising a rotor divided into at least three sections secured in tandem relation, a like number of stator sections disposed along the length of said rotor and surrounding said rotor, a concentric winding mounted at the inner periphery of each of said stator sections, a plurality of pairs of stator poles secured to each of said stator sections and arranged with said winding lying between each pair of poles, a tubular enclosure supported between said stator assembly and said rotor and spaced from said rotor, said rotor sections each having a plurality of salient magnetic poles, a plurality of pole pieces secured to the inner periphery of said enclosure, said pole pieces being juxtaposed to said stator poles and being equal in number thereto, said rotor poles being alignable with said pole pieces, the pole pieces juxtaposed to each stator section and the salient poles of the corresponding rotor section being displaced a fraction of a pole pitch relative to that of adjacent stator and rotor sections, and circuit means for sequentially energizing the windings of said stator sections.

2. Electrodynamic means comprising a hollow stator assembly, a rotor mounted for rotation within said assembly, an enclosure disposed between said rotor and said stator, said rotor having a plurality of salient magnetic poles, said enclosure being spaced from said rotor poles and having a plurality of pole pieces disposed on a surface of said enclosure facing said rotor and in alignable relationship with said rotor poles, a field winding associated with said stator assembly, said pole pieces being disposed in the magnetic paths of said winding, and said enclosure being fabricated from a magnetic material and engaging the inner periphery of said stator assembly.

3. Electrodynamic means comprising a hollow stator assembly, a field winding for said assembly, a plurality of stator poles formed on the inner periphery of said assembly and disposed in the magnetic circuits of said winding, a rotor mounted for rotation within said assembly and spaced therefrom, a plurality of salient magnetic poles formed on said rotor, said rotor poles being alignable with said stator poles, a unitary shell member fabricated from a magnetic material and inserted between said rotor and said stator assembly, said stator poles engaging said shell member to support said stator assembly, and a plurality of pole pieces secured to the inner periphery of said shell member and juxtaposed to said stator poles, respectively.

4. Electrodynamic means comprising a hollow stator assembly, a rotor mounted for rotation within said assembly, a unitary magnetic enclosure disposed between said rotor and said stator, said rotor having a plurality of salient magnetic poles, said enclosure being spaced from said rotor poles, a plurality of magnetic pole pieces arranged in alignable relationship with said rotor poles, said pole pieces being mounted on the surface of said enclosure facing said rotor, a field winding associated with said stator assembly, said pole pieces being disposed in the magnetic paths of said winding, and said enclosure and said pole pieces being fabricated from magnetic materials of differing permeabilities.

5. Electrodynamic means comprising a hollow stator assembly, a rotor mounted for rotation within said assembly, a unitary magnetic enclosure disposed between said rotor and said stator, said rotor having a plurality of salient magnetic poles, said enclosure being spaced from said rotor poles, a plurality of magnetic poles pieces arranged in alignable relationship with said rotor poles, said pole pieces being mounted on the surface of said enclosure facing said rotor, a field winding associated with said stator assembly, said pole pieces being disposed in the magnetic paths of said winding, said enclosure being formed from a magnetic material of relatively lower permeability, and said pole pieces being formed from a magnetic material of relatively higher permeability.

6. In an electrodynamic means having a hollow stator assembly and a rotor mounted for rotation within said stator assembly, the combination comprising a unitary magnetic enclosure for said rotor mounted between said stator assembly and said rotor, and a plurality of magnetic pole pieces secured to the inner periphery of said enclosure and facing said rotor, said pole pieces being disposed in the magnetic fluxile paths between said stator assembly and said rotor.

7. A unitary rotor enclosure for use with an electrodynamic means having a hollow stator assembly and a rotor mounted for rotation within said stator assembly, said enclosure being shaped for insertion between said stator assembly and said rotor and having a plurality of magnetic pole pieces secured to the inner periphery of said enclosure, said pole pieces being arranged such that, when said enclosure is so inserted, they are disposed in the magnetic fluxile paths between said stator assembly and said rotor, and said enclosure and said pole pieces being fabricated from magnetic materials of differing permeabilities, respectively.

8. A unitary rotor enclosure for use with an electrodynamic means having a hollow stator assembly and a rotor mounted for rotation within said stator assembly, said enclosure being shaped for insertion between said stator assembly and said rotor and having a plurality of magnetic pole pieces secured to the inner periphery of said enclosure, said pole pieces being arranged such that, when said enclosure is so inserted, they are disposed in the magnetic fluxile paths between said stator assembly and said rotor, said enclosure being formed from a magnetic material of relatively lower permeability, and said pole pieces being formed from a magnetic material of relatively higher permeability.

9. Electrodynamic means comprising a hollow stator assembly, a rotor mounted for rotation within said stator assembly, said stator assembly having at its inner periphery a plurality of winding slots defining salient magnetic poles on each side of said slots, a unitary magnetic rotor enclosure mounted between said stator assembly and said rotor, said enclosure being spaced from said rotor and fitting relatively closely within said stator poles, a plurality of magnetic pole pieces secured to the inner periphery of said enclosure in juxtaposed relation with said stator poles.

10. Electrodynamic means comprising a rotor divided into at least three sections secured in tandem relation, a like number of stator sections disposed along the length of said rotor and surrounding said rotor, each of said stator sections having at least one concentric winding slot disposed at its inner periphery and having a winding mounted in said slot, said slots dividing the inner periphery of each stator section into at least two salient magnetic poles, a unitary magnetic rotor enclosure supported between said stator sections and said rotor, said enclosure being spaced from said rotor and fitting relatively closely within said stator poles, a plurality of magnetic pole pieces juxtaposed to each of said stator poles and mounted on the inner periphery of said enclosure, said rotor sections each having a plurality of magnetic salient poles alignable with said pole pieces, respectively, the pole pieces juxtaposed to each stator section and the salient poles of the corresponding rotor section being displaced a fraction of a pole pitch relative to those of adjacent stator and rotor sections, and circuit means for sequentially energizing the windings of said stator sections.

11. Electrodynamic means comprising a rotor divided into an even number of at least four sections secured in tandem relation, a like number of stator sections disposed along the length of said rotor and surrounding said rotor, each of said stator sections having at least one concentric winding slot disposed at its inner periphery and having a winding mounted in said slot, a plurality of pairs of stator poles secured to each of said stator sections and arranged with said winding lying between each pair of poles, said rotor sections each having a plurality of magnectic salient poles alignable with said stator poles, respectively, the poles of each corresponding stator and rotor spectively, and circuit means for esquentially energizing section being displaced a fraction of a pole pitch relative to those of the adjacent stator and rotor sections, re- the windings of groups of said stator sections, said groups each numbering inclusively between two and one-half the total number of said stator sections.

12. Electrodynamic means comprising a rotor divided into an odd number of at least five sections secured in tandem relation, a like number of stator sections disposed along the length of said rotor and surrounding said rotor, each of said stator sections having at least one concentric winding slot disposed at its inner periphery and having a winding mounted in said slot, a plurality of pairs of stator poles secured to each of said stator sections and arranged with said winding lying between each pair of poles, said rotor sections each having a plurality of magnetic salient poles alignable with said stator poles, respectively, the poles of each corresponding stator and rotor section being displaced a fraction of a pole pitch relative to those of the adjacent stator and rotor sections, respectively, and circuit means for sequentially energizing the windings of groups of said stator sections, said groups each numbering inclusively between two, and a half less than one-half the total number of said stator sections.

13. Electrodynamic means comprising a hollow stator assembly, a rotor mounted for rotation within said assembly, a unitary magnetic enclosure disposed between said rotor and said stator, said rotor having a plurality of salient magnetic poles, said enclosure being spaced from said rotor poles an annulus secured to the inner periphery of said enclosure and disposed in axial alignment with at least a portion of said rotor poles, a plurality of magnetic pole pieces disposed on the inner periphery of said annulus and in alignable relationship with said portion of said rotor poles, a field winding associated with said stator assembly, and said pole pieces being disposed in the magnetic paths of said winding.

References Cited in the file of this patent

UNITED STATES PATENTS

| | | |
|---|---|---|
| 1,440,729 | French | Jan. 2, 1923 |
| 1,697,142 | Roller | Jan. 1, 1929 |
| 2,153,563 | Hubacker | Apr. 11, 1939 |
| 2,310,422 | Gold | Feb. 9, 1943 |
| 2,787,719 | Thomas | Apr. 2, 1957 |
| 2,789,173 | Penlington et al. | July 2, 1957 |

FOREIGN PATENTS

| | | |
|---|---|---|
| 404,011 | Germany | Oct. 10, 1924 |
| 836,966 | Germany | Apr. 7, 1952 |